March 26, 1929.  R. E. POWELL  1,706,740
HEATED TOOL
Filed May 13, 1926
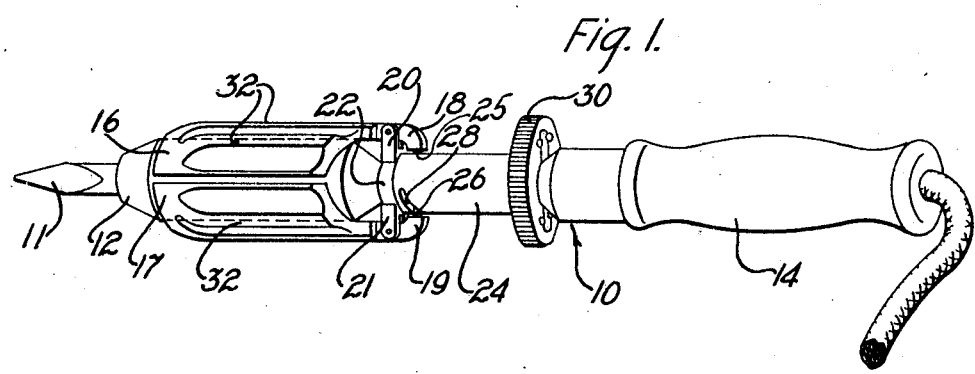
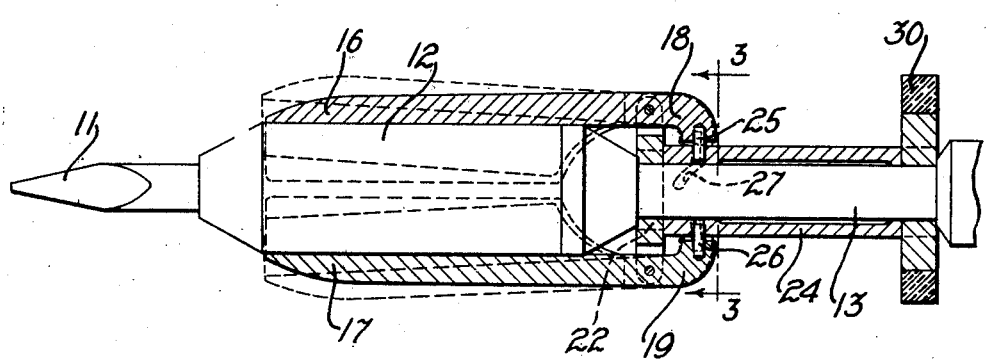
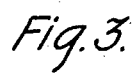
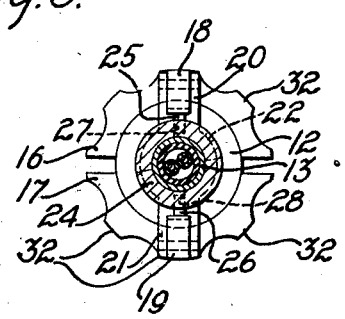
Inventor
Raymond E. Powell
by *Att'y.*

Patented Mar. 26, 1929.

1,706,740

UNITED STATES PATENT OFFICE.

RAYMOND EUGENE POWELL, OF MAYWOOD, ILLINOIS, ASSIGNOR TO WESTERN ELECTRIC COMPANY, INCORPORATED, OF NEW YORK, N. Y., A CORPORATION OF NEW YORK.

HEATED TOOL.

Application filed May 13, 1926. Serial No. 108,817.

This invention relates to heated tools, and more particularly to soldering irons.

The invention is particularly directed to that class of electrical soldering operations wherein the soldering iron is used intermittently or under varying voltage conditions, and which necessarily require a great amount of accurately controlled heat. It is essential that the iron produce a sufficient amount of heat to perform the soldering operation in addition to that which is dissipated through the parts being soldered. An electrically heated soldering iron so employed has a tendency to become so overheated as to injure or destroy the heating element or otherwise damage the iron if allowed to remain unused for any appreciable amount of time while connected with the source of current so as to be ready for use. In certain classes of work it is also desirable to conserve as much as may be possible the heat of the iron during soldering operations.

The object of the present invention is the provision in a soldering iron, of a simple and efficient means for accurately controlling the temperature of the iron without disconnecting it from its source of heat.

In accordance with the general features of the invention, one embodiment thereof comprises an electrically heated soldering iron provided with a split externally ribbed metallic sheath which may be adjusted to more or less closely embrace the shell or heat generating portion of the iron, and thus either dissipate or conserve the heat generated by the iron.

Other features and advantages of the invention will become apparent in the following description, reference being had to the accompanying drawing, wherein Fig. 1 is a perspective view of a soldering iron embodying the features of the invention;

Fig. 2 is an enlarged elevation, partly in section, of a portion of the iron shown in Fig. 1, and Fig. 3 is a detail section taken on line 3—3 of Fig. 2.

Referring now to the drawing in detail and particularly to Fig. 1 thereof, the numeral 10 indicates, generally, an electrically heated soldering iron of any well known construction comprising, essentially, a tip portion 11, a shell or heat generating portion 12, a stem portion 13, and a suitable handle 14. The iron shown may be of the type illustrated and described, in detail, in Patent 1,400,156 issued to Griffin et al., December 13, 1921, and since the present invention is not particularly concerned therewith, a detailed disclosure thereof is believed to be unnecessary in the present application.

The improved temperature controlling attachment comprises a pair of complementary members 16 and 17 designed to substantially embrace the heat generating portion 12 of the iron. The members 16 and 17 are provided with elongated reduced portions 18 and 19, respectively, by which they are pivotally supported in diametrically opposed bifurcations 20 and 21 of a clamp 22 secured to the stem portion 13. A sleeve or tubular member 24 is rotatably mounted upon the stem portion 13 between the clamp 22 and the handle 14. Pins 25 and 26 projecting inwardly from the reduced portions 18 and 19, respectively, of the members 16 and 17 engage diametrically opposed cam slots 27 and 28 formed in the sleeve 24. By this construction it will be obvious that by turning the sleeve 24 in a clockwise or counter-clockwise direction (Fig. 3), the members 16 and 17 are moved toward or away from the heat generating portion 12 of the iron. To facilitate turning the sleeve 24 to adjust the members 16 and 17, a knurled disk 30 composed of fiber or other suitable material of low heat conductivity is provided, being preferably secured to the end of the sleeve adjacent the handle of the iron.

The members 16 and 17 may be composed of any suitable heat conducting metal, preferably aluminum, because of its relatively high heat conducting capacity. In order to increase the heat radiating capacity of these members, the outer surfaces thereof are provided with a plurality of ribs 32 to increase the heat radiating surfaces thereof.

When the iron is not in use or if for some reason the iron may tend to become too hot, the members 16 and 17 are adjusted so that they contact snugly with the heat generating portion 12 of the iron. This is accomplished by turning the disk 30 in a clockwise direction (Fig. 3) until the ends of the slots 27 and 28 engage the pins 25 and 26, respectively. When closed tightly upon the shell of the iron, the members 16 and 17 serve to dissipate heat from the iron very rapidly due to the high heat conductivity and the large heat radiating surface of the members. If, for any reason, the iron tends to cool too rapidly or fails to generate a sufficient amount of heat, the members 16 and 17 may be adjusted by means of the knurled disk 30 so that they are spaced slightly away from the heat generating portion 12, as shown in dotted outline in Fig. 2. This provides an air gap between the members and the iron which serves to preserve the heat generated within the iron.

A soldering iron embodying the features of this invention may be maintained at a substantially uniform temperature whether in use or at rest, and this without necessitating the disconnection or limitation of the current supplied to the iron by external resistances or other devices to avoid over-heating thereof. Thus the iron is always ready for immediate use since it is not necessary to await the appreciable amount of time required after the application of the electrical current to the heating element for the transformation of that current into heat and the flow of the heat to the soldering tip.

What is claimed is:

1. In a soldering iron having a heat generating portion, means for regulating the temperature of the iron comprising a member designed to substantially encircle the iron, and means for moving said member laterally towards and away from said heat generating portion.

2. In a soldering iron having a heat generating portion, means for regulating the temperature of the iron comprising a split metallic sheath designed to substantially embrace said heat generating portion, and means for adjusting said sheath towards and away from the iron.

3. In a soldering iron, a heat generating portion, a stem portion, a pair of complementary members designed to substantially embrace said heat generating portion, means for pivotally supporting said members, and a sleeve loosely mounted upon the stem portion, said sleeve having cam slots engaging the ends of the members for adjusting them towards and away from the heat generating portion.

4. In a soldering iron, a heat generating portion, a stem portion, a pair of complementary heat dissipating members designed to substantially embrace said heat generating portion, means for pivotally supporting said members, a sleeve loosely mounted upon the stem portion, said sleeve having cam slots engaging the ends of the members for adjusting them towards and away from the heat generating portion, and a knurled disk secured to said sleeve for operating it to adjust the heat dissipating members.

5. A temperature controlling attachment for soldering irons comprising a pair of complementary members pivotally attached to the iron and cooperating to substantially embrace a portion of the iron, and a rotatable sleeve having diametrically opposed cam slots engaging said members for adjusting them laterally with respect to the iron.

6. In an electrically heated device, means substantially encasing the heated portion and having a high heat conductivity, and means for varying the distance between the heated portion of the heated device and the heat conducting means whereby the temperature of the heated device can be controlled without varying the constant input of electric energy.

7. In a device having a heated portion, a heating means therefor, means for dissipating heat from the heated portion, and means for regulating the distance between the heat dissipating means and the heated portion to control the temperature of the heated device without varying the amount of heat transferred from the heating means.

In witness whereof, I hereunto subscribe my name this 26 day of April A. D., 1926.

RAYMOND EUGENE POWELL.